(No Model.)

G. C. RICHARDS.
LOCK NUT.

No. 491,814.  Patented Feb. 14, 1893.

Witnesses,

Inventor,
George C. Richards
By Dewey & Co.
Attys

UNITED STATES PATENT OFFICE.

GEORGE C. RICHARDS, OF SISSON, CALIFORNIA, ASSIGNOR OF ONE-HALF TO R. A. SHADE, OF SAME PLACE.

LOCK-NUT.

SPECIFICATION forming part of Letters Patent No. 491,814, dated February 14, 1893.

Application filed April 1, 1892. Serial No. 427,397. (No model.)

*To all whom it may concern:*

Be it known that I, GEORGE C. RICHARDS, a citizen of the United States, residing at Sisson, Siskiyou county, State of California, have invented an Improvement in Lock-Nuts; and I hereby declare the following to be a full, clear, and exact description of the same.

My invention relates to the class of nuts for holding other nuts in place.

It consists in a nut formed of a coiled spring, the normal interior diameter of which is less than the diameter of the bolt it is to fit, said spring being internally threaded to fit the threads of the bolt.

The object of my invention is to provide a simple and effective lock nut which by reason of its construction can be readily fitted to the bolt and will firmly bind thereon.

Figure 1:
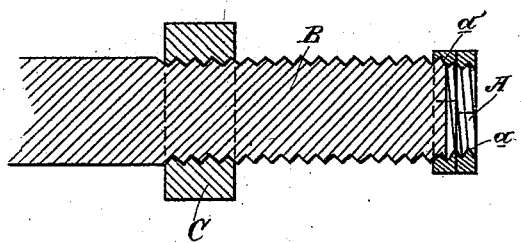
Figure 2:
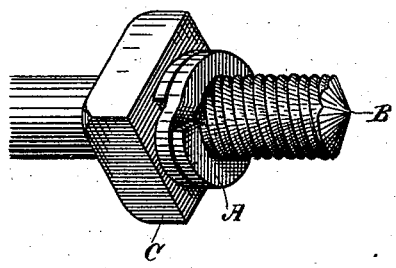

Referring to the accompanying drawings for a more complete explanation of my invention, Figure 1 is a section of my lock nut showing its application. Fig. 2 is a perspective view of same.

A is my lock nut. It is formed of a coiled spring. Its coils may be one or more in number, and its exterior contour may be curved or angular. It may be round or polygonal, and its sides may be straight or inclined as desired. To make it shapely, it is preferable to bend its body coils, so that its ends will lie in flush therewith, though this is not essential. This nut is internally threaded as shown at $a$, and its normal interior diameter is less than the diameter of the bolt B on the threads of which it is seated. The thread $a'$ of the nut which is adjacent to that face which enters first on the bolt is made of larger diameter than the other threads, so that at this entrance thread the diameter of the nut is large enough to permit it to be entered upon the bolt end. Then by screwing up the nut, it will expand and feed itself on the bolt, fitting very tightly thereon, so that it will not be jarred loose.

C is the nut to be locked by nut A. It is evident that without the larger entrance thread of the nut, said nut may be entered on a bolt, the end of which is tapered, but I prefer the former construction. The lock nut is designed to be used on the outside of the nut to be locked and effectually prevents it from working off the bolt, especially on bridges, wagons or cars where the plain nut tightens against the wood-work and the vibration is great.

Having thus described my invention, what I claim as new and desire to secure by Letters Patent is—

A lock-nut, consisting of a coiled spring, the interior surface of which is formed with screw-threads, the entrance one of which is of greater diameter than the remainder, said nut having its normal interior diameter less than that of the bolt on which it fits, whereby said nut in seating itself on the bolt is forcibly expanded, and is thereby, on account of its springy character, tightened upon said bolt, substantially as herein described.

In witness whereof I have hereunto set my hand.

GEORGE C. RICHARDS.

Witnesses:
D. R. McCLOUD,
E. E. VAN WINKLE.